(No Model.) 4 Sheets—Sheet 1.
M. F. B. RICE.
PROCESS OF AND MEANS FOR PREPARING MEDICATED BATHS.
No. 360,173. Patented Mar. 29, 1887.
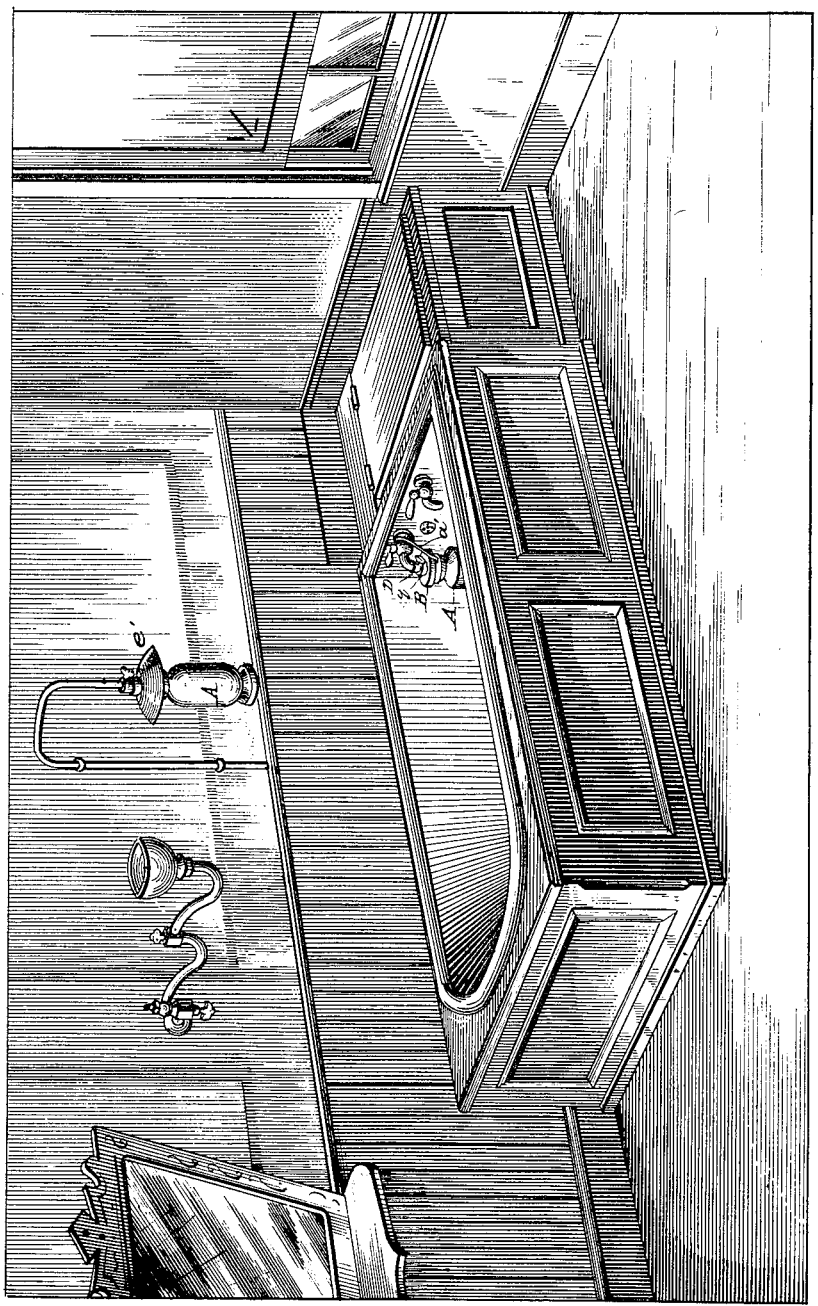

(No Model.)
M. F. B. RICE.
PROCESS OF AND MEANS FOR PREPARING MEDICATED BATHS.
No. 360,173. Patented Mar. 29, 1887.
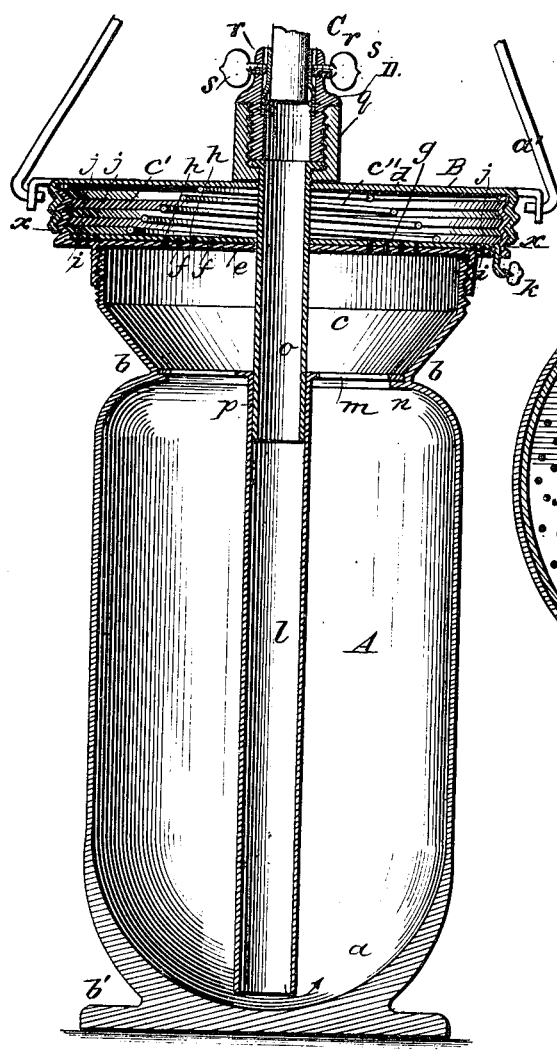
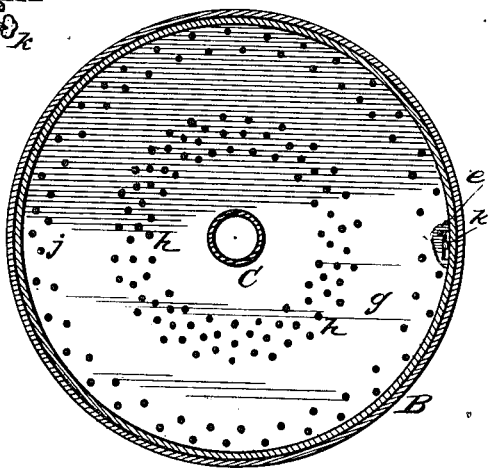
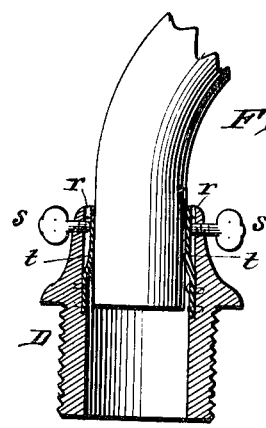

(No Model.) 4 Sheets—Sheet 3.
M. F. B. RICE.
PROCESS OF AND MEANS FOR PREPARING MEDICATED BATHS.
No. 360,173. Patented Mar. 29, 1887.
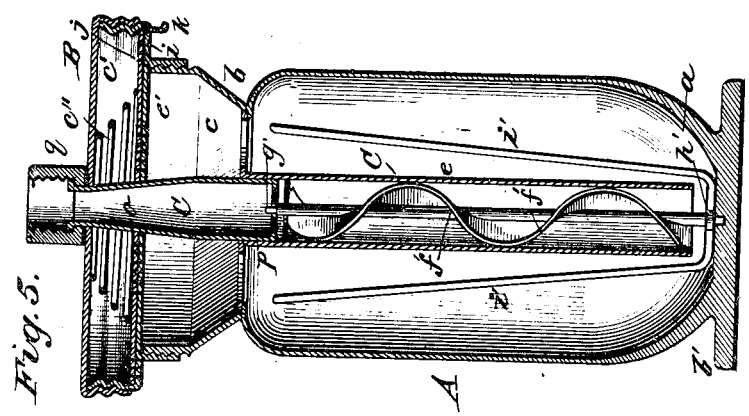
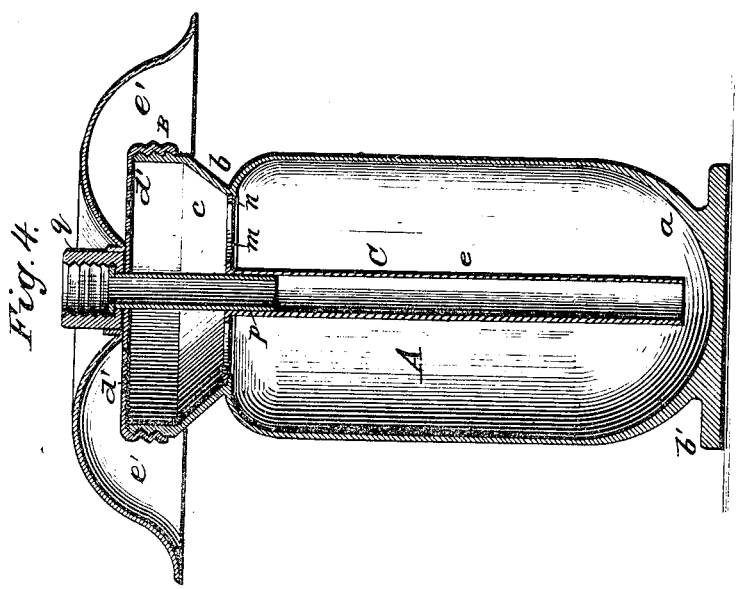

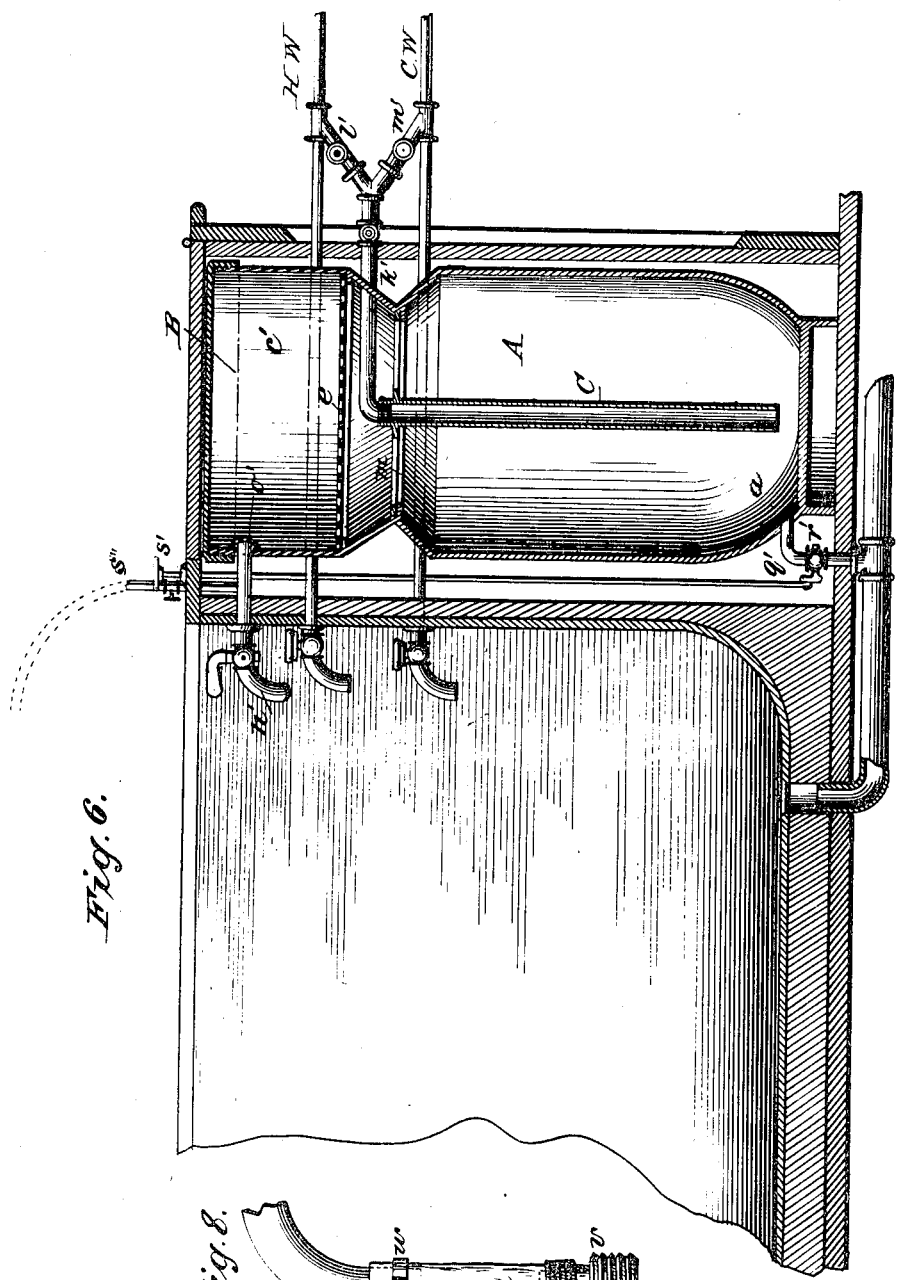

UNITED STATES PATENT OFFICE.

MARTIN F. B. RICE, OF WASHINGTON, DISTRICT OF COLUMBIA.

PROCESS OF AND MEANS FOR PREPARING MEDICATED BATHS.

SPECIFICATION forming part of Letters Patent No. 360,173, dated March 29, 1887

Application filed September 13, 1886. Serial No. 213,894. (No model.)

*To all whom it may concern:*

Be it known that I, MARTIN F. B. RICE, a citizen of the United States, residing at Washington, in the District of Columbia, have invented certain new and useful Improvements in Processes of and Means for Preparing Medicated Baths; and I do hereby declare the following to be a full, clear, and exact description of the invention, such as will enable others skilled in the art to which it appertains to make and use the same.

This invention relates to a process of and means for preparing medicated baths, and has for its object the construction of a simple, cheap, and efficient device by which water used for bathing may be charged with medicinal properties while flowing into a suitable bathing-vessel.

The invention will be hereinafter described, and particularly pointed out in the claims.

The use of medicated baths for hygienic purposes has become quite prevalent throughout the civilized portions of the globe, and many persons travel great distances to avail themselves of the pleasure and the benefits derived from ocean and mineral baths. To the invalid and the delicately constituted the fatigue attending traveling long distances is objectionable, as it frequently exhausts their strength, and on their return to their homes from watering-places or springs where they have been treated they find that what had been gained by the treatment to which they had been subjected has been lost by the drain upon their systems caused by exposure and traveling.

To render saline baths accessible to delicate persons and invalids who cannot endure the fatigue and exposure incident to traveling, and to others who cannot bear the expense attending a trip to watering-places, ocean-salt has been prepared as an article of commerce, and is sold in packages for the use of families in ordinary bath-tubs or other suitable bathing-vessels at home.

The prevailing practice of preparing a salt-bath is to draw the quantity of water desired in a bath-tub or other bathing-vessel, and then to put in the requisite amount of salt necessary to impart to the water the proper saline qualities and let it dissolve. The dissolving process of ocean-salt in an open vessel with the water in a static state requires a great deal of time, an hour at least being necessary to dissolve the salt required to charge a thirty-gallon bath. This loss of time caused by having to wait for the salt to dissolve is one great objection to its use, as few persons have sufficient time at their disposal to wait until a bath can be prepared. Another objection to the system is that the sand, pebbles, and other foreign indissoluble matter contained in the salt is deposited in the bottom of the bathing-vessel, to the discomfort and annoyance of the bather when the water is agitated, and is carried off from bath-tubs into the waste-pipe, and in a short time fills the pocket or bend in the pipe and destroys the utility of the trap to prevent the escape of sewer-gas into the building. My invention is designed to overcome all the objections incident to such a preparation of salt-water baths, and is, furthermore, adapted to prepare mineral, aromatic, or other medicated baths with great facility and economy.

It is a well-known fact that chemists by analysis have discovered the component parts of the water from nearly all the famous mineral springs in this and other countries, and by formula they prepare salts which embody all the properties of the water of any of the various springs. These salts under the operation of my invention can be made available for bathing purposes at the homes of invalids or other persons desiring to use them.

Decoctions made from various berries, herbs, and roots are frequently used. These may be prepared with facility and great convenience by placing them in the vessel hereinafter described, subjecting them to boiling water, extracting their properties, and charging the water with them.

Distillations may also be readily effected by the application of my invention.

In the accompanying drawings, which form a part of this specification, Figure 1 is a perspective showing the application of my invention to a bath-tub. Fig. 2 is a vertical section; Fig. 3, a horizontal section on the line *x x*, Fig. 2. Figs. 4 and 5 show modifications. Fig. 6 shows my invention applied to a bath-tub as a permanent fixture. Fig. 7 shows a device for rigid attachment to a faucet, and Fig. 8 shows a flexible connection.

In the several figures, A represents an elongated cylindrical vessel, which may be made of metal, ceramics, glass, or other suitable material, and of other configurations, according to the uses to which it is to be applied. The interior of the vessel is provided with a concave bottom, $a$, and is contracted at $b$ to form a reverberatory agitating-chamber. Above the contraction $b$ the mouth of the vessel is expanded or flaring, as at $c$, to form a funnel to facilitate the charging of the vessel with the material to be treated. The extreme upper end of the vessel is provided with a screw-thread or other convenient means for securing a detachable top, B, which has a chamber, $c'$, in it, and is provided with a removable cover, $d$, also secured by a screw-thread or other suitable means of attachment.

The supplemental chamber $c'$ is separated from the agitating-chamber by a diaphragm, $e$, provided with a foraminous passage, $f$, which forms a strainer for the liquid which passes through it, and upon said diaphragm $e$ is seated a gate, $g$, also provided with a foraminous passage, $h$, which corresponds with the passage $f$.

The chamber $c'$ is provided with a foraminous discharge-passage, $i$, and the gate $g$ is provided with a similar passage, $j$, which registers therewith. By adjusting the gate $g$ the discharge of the liquid may be graduated at will, the adjustment being effected by moving the gate through the medium of the handle $k$, which projects through the bottom of the chamber $c'$.

C represents a supply-pipe, which enters the top of the vessel and terminates near the bottom of the agitating-chamber, and is made in detachable sections. The lower section, $l$, is secured to a spider, $m$, which has bearings upon seats $n$ in the neck of the vessel, and is held in its place by suitable fastenings. The upper section, $o$, of the pipe is secured to the removable cover $d$, extends down through the chamber $c'$, and is telescopically or otherwise connected to the lower section, $l$, as shown at $p$. The outer end of the pipe C is provided with a union-coupling, $q$, for connection to faucets having screw-threaded ends for the attachment of hose, &c. It frequently occurs, however, that bath-tub faucets are not provided with means for screw attachment. To meet such an emergency, I provide an attachment, D, (shown in Fig. 7,) which engages with the coupling $q$ at one end, while the opposite end is provided with a socket, $r$, having thumb-screws $s$ $s$ projecting through its walls.

In finely-finished bath-tubs the faucets are polished or nickel-plated, and the use of the screws $s$ $s$ would deface them. To provide against such a result, I insert in the socket $r$ leaf-springs $t$ $t$, against which the ends of the screws bear and press them against the faucet with sufficient pressure to firmly hold the vessel A in position. In some bath-tubs the faucets are short, and do not afford sufficient space for attaching the vessel A. In such instances I apply the flexible connection shown in Fig. 8, and in which $u$ is a piece of rubber tubing provided with a coupling-section, $v$, and is secured to the faucet by a metallic clamp, $w$. When the vessel A is attached to a faucet, the detachable bail or handle $a'$ is thrown over the top of the faucet to sustain at least part of the weight. The bail also constitutes a convenient means for carrying the vessel, and for holding it with one hand while the other is engaged in making connection with the faucet, and may be removed at will.

The bottom of the vessel A is provided with a projecting flange, $b'$, which forms a convenient seat or base for the vessel. The gate $g$ is held to its seat upon the diaphragm $e$ by means of a volute spring, $c''$, the base of which rests upon the gate between the two concentric foraminous passages, while the upper end of the spring surrounds the pipe C, and is confined in the chamber $c'$ by means of the cover $d$.

In Fig. 4 I have shown a simple form of construction, by which the supplemental chamber $c'$ is dispensed with, and a foraminous discharge-passage, $d'$, is formed in the upper wall of the metallic top B, and is covered by a hood or deflector, $e'$. This form is especially adapted for shower-baths, as shown in the application of the invention in Fig. 1, and in it the combined area of the discharge-passage is less than the area of the supply-pipe, whereby a certain degree of pressure is maintained.

In some instances a mechanical agitator may be found desirable. In Fig. 5 I have shown a construction in which a mechanical agitator is applied. Within the lower section of the supply-pipe C is secured a spiral blade or turbine, $f'$, supported by pintles $g'$ $h'$, and from the latter extend arms $i'$ up into the agitating-chamber, and said arms are rotated by the column of water passing through the pipe C into the vessel.

In fitting out new buildings, or when placing new bath-tubs in old buildings, it may be found desirable to make my device a permanent attachment to the tub. In Fig. 6 I have shown such a construction, and in which the vessel A is placed at one end of the tub and provided with a pipe-section, $k'$, which has branches $l'$ $m'$, the former connecting with the hot-water pipe and the latter with the cold-water pipe, which supply water to the tub. The chamber $c'$ in the top B is provided with the diaphragm $e$, having a foraminous passage through it, and with a faucet, $n'$, which is provided with a strainer, $o'$, attached to the wall of the top B and projects into the bath-tub. The lower end of the vessel A is connected with the waste-pipe of the bath-tub by a section, $q'$, through which the liquid remaining in the vessel after the tub has been charged can be withdrawn. The passage leading out of the vessel A into the section $q'$ should also be foraminous, to prevent any solids from getting into and clogging said section. The discharge of the liquid from the vessel A through the section $q'$ is controlled by a cock, $r'$, from which a handle, $s'$, projects through the top of the casing of the tub. In this application of my invention the vessel A is kept out of the bath-tub, and either hot or cold water may be conducted through the agitating-chamber, according to the material to be used for preparing a bath. The diaphragm $e$ is detachably secured in the top B for removal to insert the material for charging the agitating-chamber. A connection may also be made with the chamber $c'$, for shower-bath purposes, if desired, as at $s''$.

The operation is as follows: Salt or other solvent having been put in the vessel A, it is attached to a pipe, through which water under pressure is forced into the agitating-chamber of the vessel, and coming in contact with the salt throws it up against the circumferential wall of the chamber, and when it reaches the curved portion of the walls at the neck of the vessel the particles are directed toward the center of the chamber and gravitate toward the bottom, where they are again caught up and agitated until they are completely dissolved and incorporated with the water. The water in passing through the foraminous passage $f$ in the diaphragm $e$ is strained, and all foreign matter which will not dissolve is retained in the agitating-chamber. The water in the supplemental chamber $c'$, charged with the medicinal properties of the salt or other solvent, is discharged through the foraminous passage $i$, and is sprayed or comminuted.

When it is desired to increase the strength of the bath, the gate $g$ is adjusted so as to partially cut off the discharge-passage, and thus subject the water to the action of the salt or other medicinal matter for a longer period of time. In producing decoctions and distillations the discharge may be reduced to a mere drip, if desired, by adjusting the gate $g$ so that only minute particles can pass through the perforations.

It is obvious that many other applications of my invention will be suggested to persons using the device herein shown and described, and I do not, therefore, limit myself to the uses enumerated. Other modifications may also be made without departing from the spirit of my invention.

Having thus fully described my invention, what I claim is—

1. The process of preparing saline or other medicated baths, which consists in subjecting a solvent to the action of water under pressure, agitating the solvent for dissolving and incorporating it with the water, and straining the water for removing the sediment and foreign matter, substantially as described.

2. The process of preparing saline or other medicated baths, which consists in conducting water into a closed vessel containing salt or other soluble medicinal matter, agitating, dissolving, and incorporating the salt with the water under pressure in said vessel, straining the water, and finally discharging it into a suitable bathing-vessel, substantially as described.

3. The process of charging water with saline or other medicinal properties, which consists in conducting water into a closed vessel containing salt or other soluble medicinal matter, agitating, dissolving, and incorporating the salt with the water under pressure in said vessel, straining the water, and finally discharging it in comminuted streams, substantially as described.

4. The combination, with a water supply pipe, of a receptacle constituting an agitating-chamber to contain soluble material, and provided with a connection for attachment to said pipe, and a strainer, substantially as described, whereby the soluble material is agitated, dissolved, and incorporated with the water flowing through said receptacle under pressure and strained in its discharge.

5. The combination, with a bath tub, of a faucet communicating with a water-supply pipe and a receptacle constituting an agitating-chamber, provided with a water-supply pipe and a strainer, the receptacle being arranged with such relation to the tub that water flowing through it under pressure will agitate, dissolve, and incorporate soluble material with it and strain it in its discharge, substantially as described.

6. A device for preparing medicated baths, consisting of a receptacle constituting an agitating-chamber for containing a solvent, a water-supply pipe, and a foraminous discharge arranged so that water passing through said receptacle under pressure will agitate, dissolve, and incorporate the solvent therewith and strain it in its discharge, substantially as described.

7. A device for preparing medicated baths, consisting of a receptacle constituting an agitating chamber for containing a solvent, a water-supply pipe projecting into and terminating near the bottom thereof, and a foraminous discharge, all combined and arranged so that water passing through said receptacle under pressure will agitate, dissolve, and incorporate the solvent with the water and strain it in its discharge, substantially as described.

8. A device for preparing medicated baths, consisting of an elongated receptacle constituting an agitating-chamber for containing soluble medicinal matter, a supply-pipe entering the top and terminating near the bottom of said chamber, and a foraminous discharge-passage on a plane above the end of the supply-pipe, all combined and arranged so that water passing through said receptacle under pressure will agitate, dissolve, and incorporate the soluble matter with the water and strain it in its upward discharge, substantially as described.

9. A device for preparing medicated baths, consisting of an elongated cylindrical receptacle constituting a reverberatory agitating-chamber for containing soluble medicinal matter, a supply-pipe, and a foraminous discharge at or near the top of the chamber, all combined and arranged so that water passing through said receptacle under pressure will agitate, dissolve, and incorporate the soluble matter with the water and strain it in its discharge, substantially as described.

10. A device for preparing medicated baths, consisting of an elongated cylindrical receptacle constituting an agitating-chamber having a concave bottom, a supply-pipe centrally supported in said chamber and terminating near the bottom thereof, and a foraminous discharge-passage at or near the top of the chamber, all combined and arranged so that water passing through the receptacle under pressure will agitate, dissolve, and incorporate the soluble matter with the water and strain it in its discharge, substantially as described.

11. A device for preparing medicated baths, consisting of a receptacle constituting an agitating-chamber, and a supply-pipe terminating near the bottom thereof, in combination with a supplemental water-chamber separated from the agitating-chamber by a perforated diaphragm and having a foraminous discharge-passage, substantially as described.

12. A device for preparing medicated baths, consisting of an elongated cylindrical vessel constituting an agitating-chamber provided with a concave bottom and an expanded charging-inlet, in combination with a supply-pipe projecting into said chamber and terminating near the bottom thereof, and a foraminous discharge-passage at or near the top of the charging-inlet, substantially as described.

13. A receptacle constituting an agitating-chamber, in combination with a supply-pipe projecting into said chamber, a supplemental water-chamber above the mouth of said chamber and communicating therewith, and a foraminous discharge-passage, substantially as described, and for the purpose set forth.

14. A receptacle constituting an agitating-chamber and a supply-pipe projecting into said chamber, in combination with a foraminous discharge-passage and a graduating-gate for controlling said passage, substantially as described.

15. An elongated receptacle constituting an agitating-chamber and a supply-pipe projecting into said chamber, in combination with a supplemental water-chamber provided with a foraminous discharge-passage and a graduating-gate for controlling said passage, substantially as described.

16. A receptacle constituting an agitating-chamber for containing soluble matter, a supply-pipe terminating near the bottom of said chamber and provided at its outer end with a suitable connection for attachment to a faucet, and a foraminous discharge-passage at or near the top of said chamber, all combined and arranged so that water passing through said chamber under pressure shall agitate, dissolve, and incorporate said soluble matter with the water and strain it in its discharge, substantially as described.

17. A receptacle constituting an agitating-chamber and a supply-pipe terminating near the bottom thereof, in combination with a supplemental water-chamber of greater diameter than said receptacle and provided with a concentric foraminous discharge-passage constructed to discharge the water in comminuted streams, substantially as described.

18. A receptacle constituting an agitating-chamber, and a supply-pipe terminating near the bottom thereof, in combination with a supplemental chamber the bottom of which is provided with a plurality of foraminous passages, one of said passages being the inlet to said chamber and the other the discharge, substantially as described.

19. A receptacle constituting an agitating-chamber and a supply-pipe terminating near the bottom thereof, in combination with a supplemental chamber the bottom of which is provided with a plurality of foraminous passages, forming the inlet to and discharging from said chamber, and an adjustable gate having corresponding passages for graduating the inlet and discharge, substantially as described.

20. A receptacle constituting an agitating-chamber, in combination with a central supply-pipe, a supplemental chamber provided with an adjustable gate, and a tension-spring for holding said gate to its seat, substantially as described.

21. A receptacle constituting an agitating-chamber, in combination with a removable cover, a central supply-pipe, a foraminous discharge-passage, a flexible connection for attachment to a faucet, and a bail, substantially as described.

22. A receptacle constituting an agitating-chamber, a supply-pipe terminating near the bottom of said chamber, and a foraminous discharge at or near the top of the chamber, in combination with an agitator propelled by the inflowing water under pressure, substantially as described.

In testimony whereof I affix my signature in presence of two witnesses.

MARTIN F. B. RICE.

Witnesses:
 JNO. B. SEIDENSTUCKER,
 D. C. REINOHL.